US005315286A

United States Patent [19]
Nolan

[11] Patent Number: 5,315,286
[45] Date of Patent: May 24, 1994

[54] VEHICLE SECURITY SYSTEM

[76] Inventor: Michael J. Nolan, 9135 Cherry La., La Plata, Md. 20646

[21] Appl. No.: 67,597

[22] Filed: May 27, 1993

[51] Int. Cl.$^5$ .............................................. B60R 25/10
[52] U.S. Cl. .................................... 340/426; 340/429; 340/430; 180/287; 307/10.4
[58] Field of Search ............... 340/426, 429, 430, 527, 340/529, 528, 309.15; 307/10.1, 10.2, 10.3, 10.4; 180/287

[56] References Cited

U.S. PATENT DOCUMENTS

| | | | |
|---|---|---|---|
| 3,637,037 | 1/1972 | Doland et al. | 340/426 |
| 3,639,897 | 2/1972 | Teich | 340/64 |
| 3,781,789 | 12/1973 | Caleskie et al. | 340/64 |
| 4,107,962 | 8/1978 | Mackinnon | 307/10.2 |
| 4,262,279 | 4/1981 | Dublirer | 340/426 |
| 4,301,441 | 11/1981 | Baxter | 340/64 |
| 4,371,052 | 2/1983 | Brandt | 180/287 |
| 4,485,887 | 12/1984 | Morano | 180/287 |
| 4,636,651 | 1/1987 | Kilgore | 307/10 |
| 4,838,377 | 6/1989 | Kozaki et al. | 180/287 |
| 4,901,054 | 2/1990 | Waterman | 340/426 |
| 4,987,402 | 1/1991 | Nykerk | 340/426 |
| 5,216,407 | 6/1993 | Hwang | 340/429 |

Primary Examiner—John K. Peng
Assistant Examiner—Nina Tong
Attorney, Agent, or Firm—David Newman & Associates

[57] ABSTRACT

A vehicle security system including a key switch, a first relay, a second relay, a first timer, a second timer, a warning device, and a push-button switch. The key switch activates and deactivates the system. Once the key switch is in an operative position and the system is activated, the vehicle's ignition switch in an operative position activates the second relay. Operation of the second relay, or of a vehicle door switch, activates the first relay which starts the first and second timers. The first timer initiates a first timing delay and, at the end of this timing delay, activates the warning device. The warning device warns the driver that the alarm sequence has been initiated. The push-button switch initiates an engine standby mode. The second timer initiates a second timing delay and cuts off the engine unless a standby mode is initiated before the end of the second timing delay.

14 Claims, 1 Drawing Sheet

VEHICLE SECURITY SYSTEM

BACKGROUND OF THE INVENTION

The present invention is directed toward a vehicle anti-hijacking system, and more particularly to a system which prevents an unauthorized user from driving the vehicle.

DESCRIPTION OF THE RELEVANT ART

The crimes of vehicular theft and automobile hijacking, also referred to as carjacking, have a long history, resulting in various attempts in the relevant art to address and prevent these crimes.

U.S. Pat. No. 3,639,897 to Teich discloses an alarm system having a theft section and a hijack section. In the hijack section, means are provided to delay operation of a siren or alarm for a predetermined length of time after an unauthorized act such as opening the door of the vehicle, permitting the driver to be safely removed before the alarm is sounded. The siren continues and cannot be turned off for a predetermined length of time. The closing of a first relay actuates the alarm, and the closing of a second relay turns off the alarm.

U.S Pat. No. 3,781,789 to Caleskie et al. teaches an anti-hijacking system initiated by a door switch. When the door is opened, a red light is lit to indicate that the vehicle is disabled and inoperative, and the system will not be reset until both a timer and the key have been turned off. A door switch operates a relay to cut off the engine for a predetermined time controlled by the limer.

U.S. Pat. No. 4,301,441 to Baxter discloses an anti-theft system having a cut off relay, a master relay, an auxiliary relay, and a switch for setting the system to prevent starting the engine. Unauthorized attempts to operate the vehicle initiate a warning.

U.S. Pat. No. 4,371,052 to Brandt shows an anti-theft system including a number of switches to set and disable the system. Unauthorized operation of the vehicle closes a cut off relay to prevent starting of the engine.

U.S. Pat. No. 4,485,887 to Morano discloses an anti-theft system including a push button switch under the dashboard, a relay, and a time delay circuit breaker. An authorized driver pushes the push button switch to disable the anti-theft system to allow normal ignition of the vehicle. However, when an unauthorized driver, ignorant of the push button, starts the engine, the time delay circuit breaker, after a short period of time, opens to prevent ignition of the vehicle.

U.S. Pat. No. 4,636,651 to Kiloore teaches an anti-theft system including a tape switch and a relay coil. An authorized driver presses the tape switch prior to ignition to disable the system. An unauthorized driver, ignorant of the tape switch, starts the vehicle and activates a siren. Alternatively, an electrically actuated door lock may be used in place of the tape switch to disable the system.

The relevant art discloses anti-theft devices for vehicles employing various switches, relays, and warning devices, with the anti-theft devices preventing ignition of the engine depending upon the pressing of a switch known to authorized operators of the vehicle, with sirens or warnings being initiated upon an unauthorized operating of the vehicle. The relevant art also discloses the use of door switches or door locks to actuate the anti-theft devices. The use of time delays in the actuation of the anti-theft devices is also described in the relevant art, including the activation of an alarm after a delay, the cutting off the engine for a predetermined time, and the prevention of ignition of the engine after a short delay.

In addition, the relevant art teaches implementing a delayed operation of a siren or alarm for a predetermined length of time after the opening of the door of the vehicle, permitting the driver to be at a safe distance from the carjacker when the alarm is sounded, with the siren continuing to operate and unable to be turned off for a predetermined length of time. The relevant art also teaches activating warnings, by lighting a red warning light, in conjunction with cutting off the engine.

However, the relevant art does not provide for standby modes after the anti-carjacking systems have been initiated or armed by a door switch or similar switches. In addition, the relevant art does not provide the advantages of multiple time delays with windows of opportunity to activate and deactivate the anti-carjacking systems.

SUMMARY OF THE INVENTION

A general object of the invention is an anti-carjacking system for automobiles and other vehicles.

The present invention is directed toward a vehicle anti hijacking, or anti-carjacking, system comprising a control box, an alerting device, a push-button switch, and a key switch. The push-button switch is located within the reach of the driver to set the system in a standby mode. The key switch preferably is mounted through the firewall, but accessible from the passenger compartment, of the vehicle. The key switch, which is operated by a key, serves to activate and deactivate the system, depending upon whether the key in the key switch is turned 'on' or to the operative position, or turned 'off' or to the inoperative position. Once the key is turned on and the alarm sequence of the system has been activated, failure to set the system is standby mode within the time delay period alotted, using the push-button switch, will result in engine cutoff. Once engine cutoff has occurred, the key switch must be turned off in order to reset the system and enable the engine to be restarted. The control box typically is located under the hood of a vehicle. The control box includes a first relay, a second relay, a first timer and a second timer. The first relay has two normally open sets of contacts which close when the first relay operates when the door switch is activated to arm the system. The second relay has one normally open set of contacts which, in response to the vehicle's ignition switch being turned to the start or operative position, close and thereby operate the first relay. The first timer has a first delay before initiating an alerting device such as a buzzer. The second timer has a second delay before engine cut off, and activating a horn, siren, strobe, etc.

If the ignition is on, then authorized drivers activate the system upon opening the door. Both timers are activated with opening of the door. After the first delay, which may be 45 seconds, the first timer activates the alerting device. After the second delay, which may be 55 seconds, the second timer cuts off the engine and activates the horn, siren, strobe, etc. Authorized drivers, however, aware of the push-button switch and the imminent engine cut off, would have the ten second window between alerting device initiation and engine cut off to press the push button switch to set the anti-carjacking system on standby. Unauthorized drivers experience a ten second warning and then engine cut off, and activation of other alerting or alarm devices. Once engine cutoff has occurred, the disclosed invention can be reset by turning the key in the key switch from the operative to the inoperative position, thereby disabling the vehicle security system.

Additional objects and advantages of the invention are set forth in part in the description which follows, and in part are obvious from the description, or may be learned by practice of the invention. The objects and advantages of the invention also may be realized and attained by means of the instrumentalities and combinations particularly pointed out in the appended claims.

BRIEF DESCRIPTION OF THE DRAWING

The accompanying drawing, which is incorporated in and constitutes a part of the specification, illustrates preferred embodiment of the invention, and together with the description serves to explain the principles of the invention.

DETAILED DESCRIPTION OF THE PREFERRED EMBODIMENTS

Figure 1:
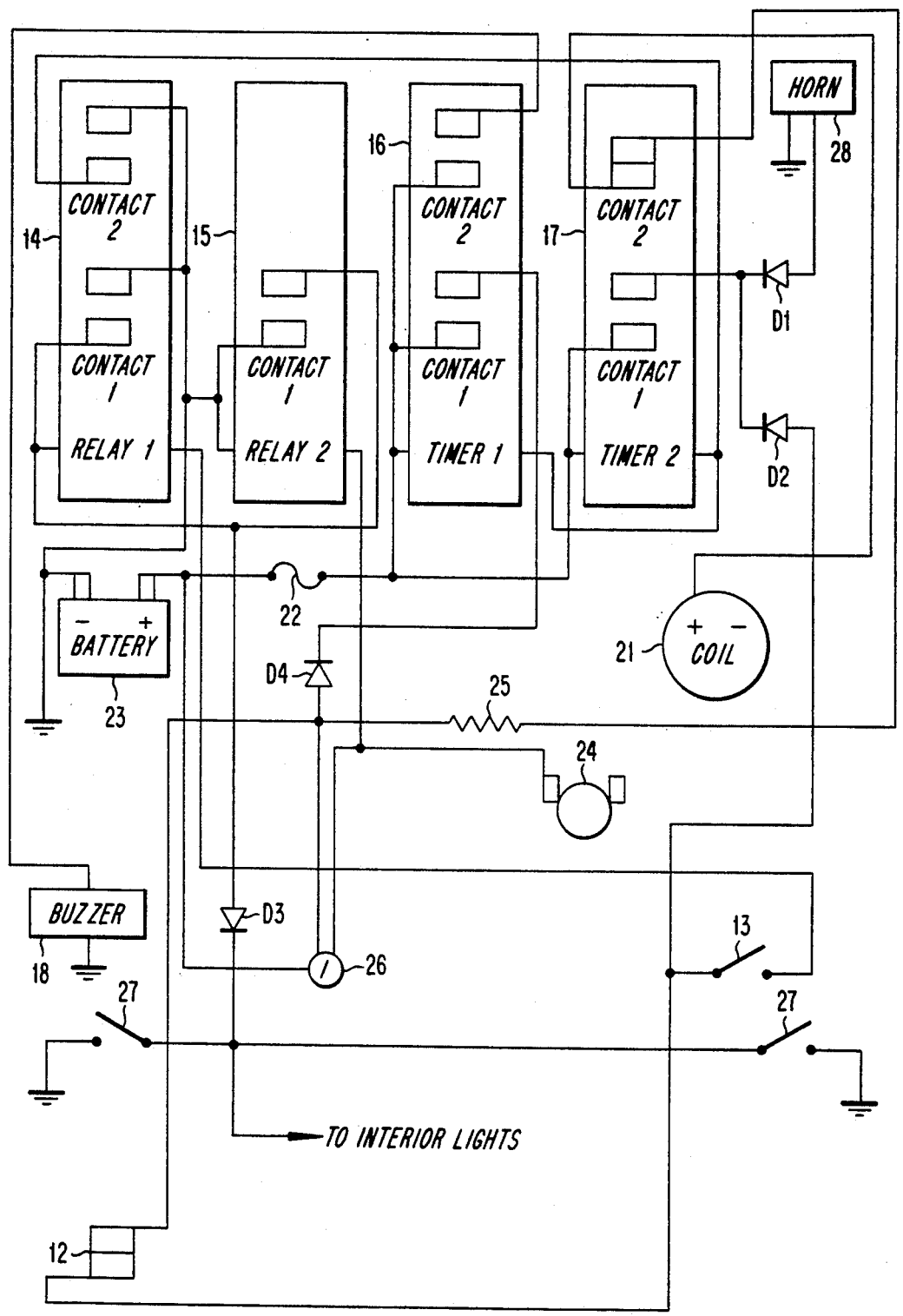
FIG. 1 is a schematic diagram of an automobile security system.

Reference now is made in detail to the present preferred embodiments of the invention, an example of which is illustrated in the accompanying drawing.

The vehicle security system broadly includes first switching means, second switching means, first relay means, second relay means, alerting means, first timing means and second timing means. The first switching means activates the system. The vehicle's ignition switch activates the second relay means. The second relay means or any one of the vehicle's door switches activates the first relay means. Second switching means initiates a standby mode. After the first switching means is activated turning the vehicle's ignition switch to the start position or opening one of the vehicle's doors triggers, the first relay means initiates the automobile security system. The first timing means initiates a first timing delay and activates the alerting means. The alerting means alerts a driver, authorized or unauthorized, that an alarm sequence has been initiated. The second timing means initiates a second timing delay and cuts off the engine unless a standby mode is initiated.

The vehicle security system is used with a vehicle having an engine, at least one door, and typically one or more interior lights. As indicated in FIG. 1, the vehicle also may include a starter, a starter solenoid 24 coupled to the starter, a coil 21, and a battery 23. Normally, the battery 23 has a negative terminal connected to a ground, i.e. the frame of the vehicle. An ignition switch 26 is coupled to the starte solenoid 24 and to the positive terminal of the battery 23. The vehicle may also have a horn 28 with a first terminal connected to the ground. As is well known in the art, the starter solenoid 24 directs power to the engine starter. The coil 21 provides sparks for engine ignition.

In the exemplary arrangement shown in FIG. 1, the first switching means, second switching means, first relay means and second relay means are embodied as a key switch 13, a push-button switch 12, a first relay 14, and a second relay 15, respectively. In standard vehicles, the first relay 14 and the second relay 15 are 12 volt direct current (DC) relays. The first timing means and second timing means are embodied as first timer 16, and second timer 17, respectively. The first timer 16 and the second timer 17 typically provide a first timing delay and a second timing delay, and after the first timing delay and second timing delay, throw or set a relay or switch. The second timing delay preferably is longer than the first timing delay. The first timing delay and the second timing delay may be fixed or adjustable. The alerting means may be embodied as an alerting device 18 such as a light, or sound device such as a buzzer.

The vehicle security system typically has a control box, and external to the control box are located the alerting device 18, a fuse 22, the push-button switch 12, and the key switch 13. The alerting device 18 or indicator preferable is located under the dashboard or in a location where the driver can hear the alerting device or see the indicator, respectively, when the alerting device 18 or indicator are activated, respectively. The alerting device 18 may be a buzzer or other noise-making device, chime, bell, or lights, operated on 12 volts DC.

Resistor 25 or resistance wire lowers voltage to the coil. The fuse 22 is located under the hood in a convenient location to the battery or to the control box. The fuse 22 protects the electrical system.

The key switch 13 can be mounted through the firewall of the vehicle with the terminals of the key switch 13 on the engine side of the firewall. A first terminal of the key switch is coupled to a second terminal of a second diode, located in the control box. A second terminal is coupled to the first relay. The key hole of the key switch 13 can be located on the passenger compartment side of the firewall. The key switch 13 should be located in an obscure or hidden area in the passenger compartment. The key switch 13 has contacts either locked open or locked closed, depending on the position of the key, 'on' or 'off', in the key switch 13. The key switch serves to activate and deactivate the entire system, depending on the position of the key in the key switch. When the key is 'on' or in the operative position, the vehicle security system is activated. When the key is 'off' or in the inoperative position, the vehicle security system is deactivated. The inoperative position allows the car owner to reset the system after alarm or loan the car to an authorized driver without informing that driver of the existence of the anti-hijacking system.

The push-button switch 12 can be located within the reach of the driver, but not close to the alerting device 18, for setting the vehicle security system in a standby mode. Preferably, the push-button switch 12 is located in an obscure or hidden area in the passenger compartment of the vehicle. The push-button switch 12 has normally closed contacts, with the contacts momentarily opening when the push button is pushed. A first terminal of the push-button switch is coupled to the first terminal of the key switch, and a second terminal of the push-button switch is coupled to the resistor.

The control box typically is located under the hood away from heat sources; for example, the exhaust manifold, the pipes, etc. The control box includes therein the first relay 14, the second relay 15, the first timer 16, the second timer 17, a first diode D1, a second diode D2, a third diode D3, and a fourth diode D4.

The first relay 14 has a first set of contacts and a second set of contacts. A first terminal of the first set of contacts is connected to the ground, and a first terminal of the second set of contacts is connected to the ground. The second relay 15 has a set of contacts. The first terminal of the set of contacts is connected to the ground, and a second terminal of the set of contacts is connected to the second terminal of the first set of contacts of the first relay 14.

The first timer 16 has a first set of contacts and a second set of contacts. A first terminal of the first set of contacts and a first terminal of the second set of contacts are connected to a second terminal of the fuse 22. The first timer 16 also has a second terminal of the first set of contacts connected to fourth a diode D4, and a second terminal of the second set of contacts connected to a buzzer. The first timer 16 is typically a 12 volt DC delay timing relay having two normally open contacts with the two contacts closing when the first timer 16 operates. When the first timer 16 is activated, a first timing sequence is initiated, with a delay of, for example, 45 seconds. This delay may be fixed or adjustable. After the 45 seconds, the first timer 16 operates to close its two sets of contacts.

The second timer 17 has a first set of contacts and a second set of contacts. The first terminal of the first set of contacts is connected to a second terminal of the fuse 22. The second timer 17 also has a second terminal of the first set of contacts connected to the second terminal of the first diode D1 a and second diode D2 The second timer 17 has a first terminal of the second set of contacts connected to a positive terminal of the coil 21, and a second terminal of the second set of contacts connected to a second terminal of the resistor 25. The second timer 17 is typically a 12 volt DC delay timing relay having a first set of normally open contacts with the first set of contacts closing when the second timer 17 operates. The second timer 17 also has a second set of contacts which are normally closed. The second set of contacts open when the second timer 17 activates. Opening of the second timer 17 disconnects the coil 21, causing engine cut off. When the second timer 17 is activated, a second timing sequence is initiated, with a second delay, for example 55 seconds. This second delay may be fixed or adjustable. After the second delay, the second timer 17 operates to close its first set of contacts and open its second set of contacts. The first timer 16 might have a 45 second delay before initiating the alerting device 18. The second timer 17 might have a 55 second delay before engine cut off. In the event the vehicle security system is used with a diesel powered vehicle, the second set of contacts of the second timer 17 can be used for opening the electric circuit to a fuel solenoid valve in the fuel line. Alternatively, the second set of contacts of the second timer 17 can be used to open a path to an electric fuel pump, cause lock-up of the brakes, or for any other connect or disconnect operation which prevents further driving of the vehicle.

The first relay 14 has two normally open contacts which close when the first relay 14 operates when the door switch is activated to arm the system if the ignition is on. The first relay 14 activates by closing the door switch 27, i.e. opening the door. The second relay 15 has one normally open contact which closes when the second relay 15 operates, i.e. is activated, to operate the first relay 14. The second relay 15 is activated by turning the ignition switch 26 to an operative position.

When the ignition switch is in an operative position and the key switch is in the operative position, the second relay 15 activates, thereby closing the first contact of the second relay 15. In response to closing the first contact of the second relay 15, the first relay 14 activates, thereby closing the first and second contacts of the first relay 14.

The door switch 27 has normally open contacts when the door is closed. When the door is opened, the contacts close, and the interior lights are coupled to the ground. The vehicle security system is coupled to the door switches through the third diode D3 to prevent the ground from the first relay 14 first contact operating the interior lights.

In use, authorized drivers activate the system upon opening the door if the ignition is on, resulting, after the first timing delay, in the alerting device 18 activating. Authorized drivers, however, aware of the push-button switch 12 and the imminent engine cut off, would have the ten second window between alerting device 18 initiation and engine cut off to press the push-button switch 12 to set the anti-carjacking system on standby. Unauthorized drivers experience a ten second warning and then engine cutoff. Once engine cutoff has occurred, the system can be reset by turning the key in the key switch to the inoperative position to disable the vehicle security system.

In a carjacking scenario, with the ignition switch 26 turned on, and key-switch 13 turned on, upon opening the car door, the door switch 27 closes causing current to flow through the first relay 14. Accordingly, the first relay 14 locks up, with the first set of contacts closing, causing current to flow through the first relay 14. With the second set of contacts of the first relay 14 closing, the first timer 16 and the second timer 17 activate. Accordingly, the alerting device 18 goes off after the first delay, e.g. 45 seconds. The second timer 17 causes engine cut off by opening contacts to the coil 21 after the second delay, and locks up the first relay 14 with by-passing the push-button switch 12.

The vehicle security system can be disabled by deactivating the key switch 13. The key switch 13 can be deactivated by turning the key to the inoperative position. The inoperative position allows the car owner to reset the system after alarm or loan the car to an authorized driver without informing that driver of the existence of the anti-hijacking system. The present invention has the advantage, over the prior art, that first timing means and second timing means, embodied as first timer 16 and second timer 17, have two different time delay periods. Furthermore, a warning light or warning sound occurring at a predetermined time period is initiated prior to cutting off the engine. In addition, the present invention has the advantage of a standby mode between activation of the alerting device and the cutting off of the engine to be initiated by an authorized driver by pressing a push-button switch 12.

It will be apparent to those skilled in the art that various modifications can be made to the vehicle security system of the instant invention without departing from the scope or spirit of the invention, and it is intended that the present invention cover modifications and variations of the vehicle security system provided they come within the scope of the appended claims and their equivalents.

I claim:

1. A vehicle security system for a vehicle, said vehicle having an engine, a plurality of doors, a set of interior lights, a starter, a coil, a starter solenoid coupled to the starter, and a battery having a positive terminal and a negative terminal, with the negative terminal coupled to a ground, a resistor, an ignition switch coupled to the starter solenoid and coupled to the positive terminal of the battery, and a horn having a first terminal coupled to the ground, the vehicle security system comprising:

a first diode having a first terminal coupled to a second terminal of the horn;

a second diode having a first terminal coupled to a second terminal of said first diode;

a third diode having a first terminal coupled to the set of interior lights;

a key switching having a first terminal coupled to a second terminal of said second diode;

a push-button switch having a first terminal coupled to the first terminal of said key switch and a second terminal coupled to a first terminal of said resistor, said push-button switch having two contacts in a normally closed position, said push-button switch, responsive to being pushed, for initiating an engine standby mode by momentarily opening and returning to the closed position;

a plurality of door switches, each of said plurality of door switches having a first terminal coupled to the ground, and each of said plurality of door switches having a second terminal coupled to the first terminal of said third diode;

a buzzer having a first terminal coupled to the ground;

a fuse having a first terminal coupled to the positive terminal of the battery;

a fourth diode having a first terminal coupled to a primary terminal of the ignition switch;

a first relay having a first terminal of a first set of contacts, said first set of contacts in a normally open position, and a first terminal of a second set of contacts, said second set of contacts in a normally open position, connected to the ground, the first set of contacts closing and the second set of contacts closing when activating said first relay;

a second relay having a first terminal of a set of contacts, said set of contacts in a normally open position, connected to the ground and having a second terminal of the set of contacts connected to a second terminal of the first set of contacts of said first relay, the set of contacts of the second relay closing when activating said second relay;

a first timer having a first terminal of a first set of contacts, said first set of contacts in a normally open position, and a first terminal of a second set of contacts, said second set of contacts in a normally open position, coupled to a second terminal of said fuse, having a second terminal of the first set of contacts coupled to a second terminal of said fourth diode, and having a second terminal of the second set of contacts coupled to a second terminal of said buzzer, with said first set of contacts closing and said set of contacts closing after a first predetermined-time delay after activating said first timer;

a second timer having a first terminal of a first set of contacts, said first set of contacts in a normally opened position, coupled to the second terminal of said fuse, having a second terminal of the first set of contacts coupled to the second terminal of said first diode, having a first terminal of a second set of contacts, said second set of contacts in a normally closed position, coupled to a positive terminal of the coil, having a second terminal of the second set of contacts coupled to a second terminal of said resistor, said second timer having the first set of contacts closing and the second set of contacts opening after a second predetermined-time delay after activating said second timer;

wherein the second predetermined-time delay of said second timer is greater than the first predetermined-time delay of said first timer; and with said starter activating said second relay, at least one of said second relay or said plurality of door switches activating said first relay, and said relay activating said first timer and said second timer, said first timer initiating said buzzer, said push-button switch initiating the engine standby mode, and said second timer, responsive to an absence of the activation of said push-button switch, activating the horn and initiating engine cutoff.

2. The vehicle security system of claim 1, wherein said first timer has the first predetermined-time delay set at 45 seconds; and wherein said second timer has the second predetermined-time delay set at 55 seconds.

3. The vehicle security system of claim 1, wherein said first timer has an adjustable first time delay, with said adjustable first time delay settable within a range of first time delays, and said second timer has an adjustable second time delay, with said adjustable second time delay settable within a range of second time delays.

4. A theft and hijacking prevention system for a vehicle having an ignition switch, the theft and hijacking prevention system comprising:

a key switch having an operative position and an inoperative position;

a warning device;

a push-button switch, coupled to said key switch, said push-button switch having two contacts in a normally closed position, said push-button switch, responsive to being pushed, for setting a standby mode;

a plurality of door switches;

a first relay coupled to said key switch and coupled to each door switch of said plurality of door switches, said first relay having a first set of contacts, said first set of contacts in a normally open position, and a second set of contacts, said second set of contacts in a normally open position, with said first relay, responsive to at lest one of said plurality of door switches, for closing the first set of contacts and for closing the second set of contacts;

a second relay coupled to said first relay and coupled to said ignition switch, said second relay having a set of contacts, said set of contacts in a normally open position, with said second relay, responsive to said ignition switch in an operative position, for closing the set of contacts;

a first timer coupled to said warning device and coupled to said ignition switch, said first timer having a first set of contacts, said first set of contacts in a normally open position, and a second set of contacts, said second set of contacts in a normally open position, said first timer, responsive to said first relay, for closing the first set of contacts and for closing the second set of contacts after a first time delay after activating said first timer;

a second timer, coupled to said first timer and coupled to said first relay, having a first set of contacts, said first set of contacts in a normally opened position, and a second set of contacts, said second set of contacts in a normally closed position, with said second timer, responsive to said first relay and said first timer, for closing the first set of contacts and for opening the second set of contacts after a second time delay after activating said second timer; and wherein said key switch activating said theft and hijacking prevention system, said ignition switch activating said second relay, at least one of said second relay or said plurality of door switches activating said first relay, said first relay activating said first timer and said second timer, said first timer initiating said warning device, said push-button switch initiating the engine standby mode when activated before an end of the second time delay, and said second timer, responsive to an absence of the activation of said push-button switch before the end of the second time delay, activating the horn and the initiating engine cutoff.

5. The theft and hijacking prevention system of claim 4, wherein said second timer having the second time delay greater than the first time delay of said first timer.

6. The theft and hijacking prevention system of claim 5, wherein said second relay, responsive to the ignition switch being in an operative position and responsive to said key switch being in an operative position, activates, thereby closing the set of contacts of said second relay; and wherein said first relay, responsive to the closing of the set of contacts of said second relay, activates, thereby closing the first set of contacts of said first relay and closing the second set of contacts of said first relay.

7. The theft and hijacking prevention system of claim 5, wherein said first relay, responsive to one door switch of said plurality of door switches opening, activates, thereby closing the first set of contacts of said first relay and closing the second set of contacts of said first relay.

8. The theft and hijacking prevention system of claim 7, wherein the first set of contacts of said first relay closes for coupling the first set of contacts of said first relay to a ground; and wherein the first set of contacts of said first relay couples to the ground for locking said first relay.

9. The theft and hijacking prevention system of claim 7, wherein the second set of contacts of said first relay closes for activating said first timer and said second timer.

10. The theft and hijacking prevention system of claim 9, wherein the first time delay of said first timer is 45 seconds; and wherein the second time delay of said second timer is 55 seconds.

11. The theft and hijacking prevention system of claim 9, wherein said first timer has an adjustable first time delay, said adjustable first time delay settable within a range of first time delays, and said second timer has an adjustable second time delay, said adjustable second time delay settable within a range of second time delays.

12. The theft and hijacking prevention system of claim 9, wherein said first timer, responsive to being activated, closes the second set of contacts of said first timer after the first time delay; and wherein said warning device, responsive to the closing of the second set of contacts of said first timer, activates, thereby generating a warning sound.

13. The theft and hijacking prevention system of claim 12, wherein said second timer, responsive to being activated, opens the second set of contacts of said second timer after the second time delay; and wherein the engine of the vehicle, responsive to the opening of the second set of contacts of said second timer, cuts off.

14. The theft and hijacking prevention system of claim 12, wherein said push button, responsive to being pushed, sets the theft and hijacking prevention system to standby mode;

wherein said second timer, responsive to being activated and responsive to the setting to standby mode before the end of the second time delay, maintains the second set of contacts of said second timer in a closed position;

wherein said second timer, responsive to being activated and responsive to the end of the second time delay without the setting to standby mode, opens the second set of contacts of said second timer; and wherein an engine of the vehicle, responsive to the opening of the second set of contacts of said second timer, cuts off.

* * * * *